United States Patent [19]
Takarabe et al.

[11] Patent Number: 6,067,425
[45] Date of Patent: *May 23, 2000

[54] IMAGE PRODUCING APPARATUS HAVING A PORT FOR CONNECTION TO EXTERNAL DEVICES

[75] Inventors: Yuuji Takarabe, Toyohashi; Shinji Matsumoto, Toyokawa, both of Japan; Henry Chin, Portland, Oreg.; Steve McCallion, Portland, Oreg.; Scott Thorpe, Portland, Oreg.; Peter Wyatt, Los Angeles, Calif.

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/049,018

[22] Filed: Mar. 27, 1998

[51] Int. Cl.$^7$ .................................................. G03G 15/00
[52] U.S. Cl. ............................ 399/1; 399/90; 312/223.6; 358/296
[58] Field of Search ................................ 399/1–3, 7, 81, 399/90, 107, 110, 405; 361/683, 686; 312/223.1, 223.2, 223.3, 223.6; 395/101, 106; 358/296

[56] References Cited

U.S. PATENT DOCUMENTS

| | | | |
|---|---|---|---|
| 4,235,550 | 11/1980 | Case | 399/367 |
| 5,162,845 | 11/1992 | Ariyama et al. | |
| 5,364,196 | 11/1994 | Baitz et al. | 361/686 |
| 5,550,985 | 8/1996 | Miller et al. | 395/750 |
| 5,720,012 | 2/1998 | McVeigh et al. | 395/113 |

FOREIGN PATENT DOCUMENTS

| | | |
|---|---|---|
| 4-204952 | 7/1992 | Japan . |
| 5-309911 | 11/1993 | Japan . |
| 9-193509 | 7/1997 | Japan . |

OTHER PUBLICATIONS

IBM Catalog of Network Printer, issued Apr. 1997.

*Primary Examiner*—Joan Pendegrass
*Attorney, Agent, or Firm*—McDermott, Wil & Emery

[57] ABSTRACT

An image producing apparatus comprises a table which is provided over the upper surface of a top plate in a body thereof for placing an external device. Besides, the apparatus also comprises a connector unit which is located adjacent to the table for connection to the external device. Thus, the connection of the external device will be simplified, and besides, the external device can be operated with ease when the external device is connected to the apparatus. Furthermore, the apparatus is provided with a stationary swiveling mechanism, so that a user can easily turn a side of the body, where a sheet of paper is jammed, to the front.

11 Claims, 9 Drawing Sheets

(CABLE-LINK COMMUNICATION)

→ DIRECTION OF CURRENT
⇒ DIRECTION OF DATA TRANSFER
⋯▸ DIRECTION OF COMMAND

FIG. 3 (b)

(OPTICAL DATA COMMUNICATION)

IMAGE PRODUCING APPARATUS HAVING A PORT FOR CONNECTION TO EXTERNAL DEVICES

BACKGROUND OF THE INVENTION

The present invention relates to an image producing apparatus, such as a copier or a printer, provided with a port for connection to external devices including a personal computer, and to an image producing apparatus having a structure capable of swiveling at its stationary location.

In general, such an image producing apparatus, namely a printer, has a port provided on a back or side wall thereof for connection (by cables or infrared ray) to external devices. As the printer is placed adjacent to a desired external device such as a note computer by a user, its port is connected to the external device for printing operation. If the printer has such a trouble that a sheet of paper is jammed up in a paper passage route located on any other side than the (front) side to which an operation panel is mounted, the user has to access to the side where the paper is jammed. For ease of turning the side where the paper is jammed to the user or the front, the printer has commonly casters.

Any conventional type of the printers having its port for connection to external devices located on the back or side wall can be connected to a desired external device such as a note computer with much difficulty. Such an external device has to be placed temporarily on a table or the like for connecting its cable to the printer and this will be troublesome. The printer equipped with casters also requires an extra size of installation space for allowing its rotating action on the casters.

SUMMARY OF THE INVENTION

It is an object of the present invention to provide an image producing apparatus capable of easily connecting to a desired external device and, when connected to the external device, allowing ease of operation of the external device. It is another object of the present invention to provide an image producing apparatus which allows a user to turn its side, where a sheet of paper is jammed, to the front with no need of having an extra space for rotating the apparatus with its casters.

According to one aspect of the present invention, an image producing apparatus having a port to which an external device is connected, comprises: a body which includes an image producing unit inside thereof; and, a table which is disposed at a top surface of the body, and on which an external device is mounted; wherein the connection port is located adjacent to the table.

In the above-described construction, the apparatus allows an external device to be placed on the table provided on the body while its connecting to the printer and thus handled with ease. Also, the connection of the external device is made through the connecting port located adjacent to the table and will thus be simplified.

According to another aspect of the present invention, an image producing apparatus having a structure capable of swiveling at its stationary location, comprises: a body which includes an image producing unit inside thereof; a base member which is located on a bottom of the body; and, a joint means for joining the body to the base member such that the body is rotatable in a horizontal direction.

In the above-described construction, the apparatus allows the body to horizontally swivel about the joint means at a stationary location on the base, whereby a user can easily turn a side of the body, where a sheet of paper is jammed, to the front with no need of having an extra space for rotating the apparatus with its casters.

DETAILED DESCRIPTION OF THE EMBODIMENTS

Figure 1:
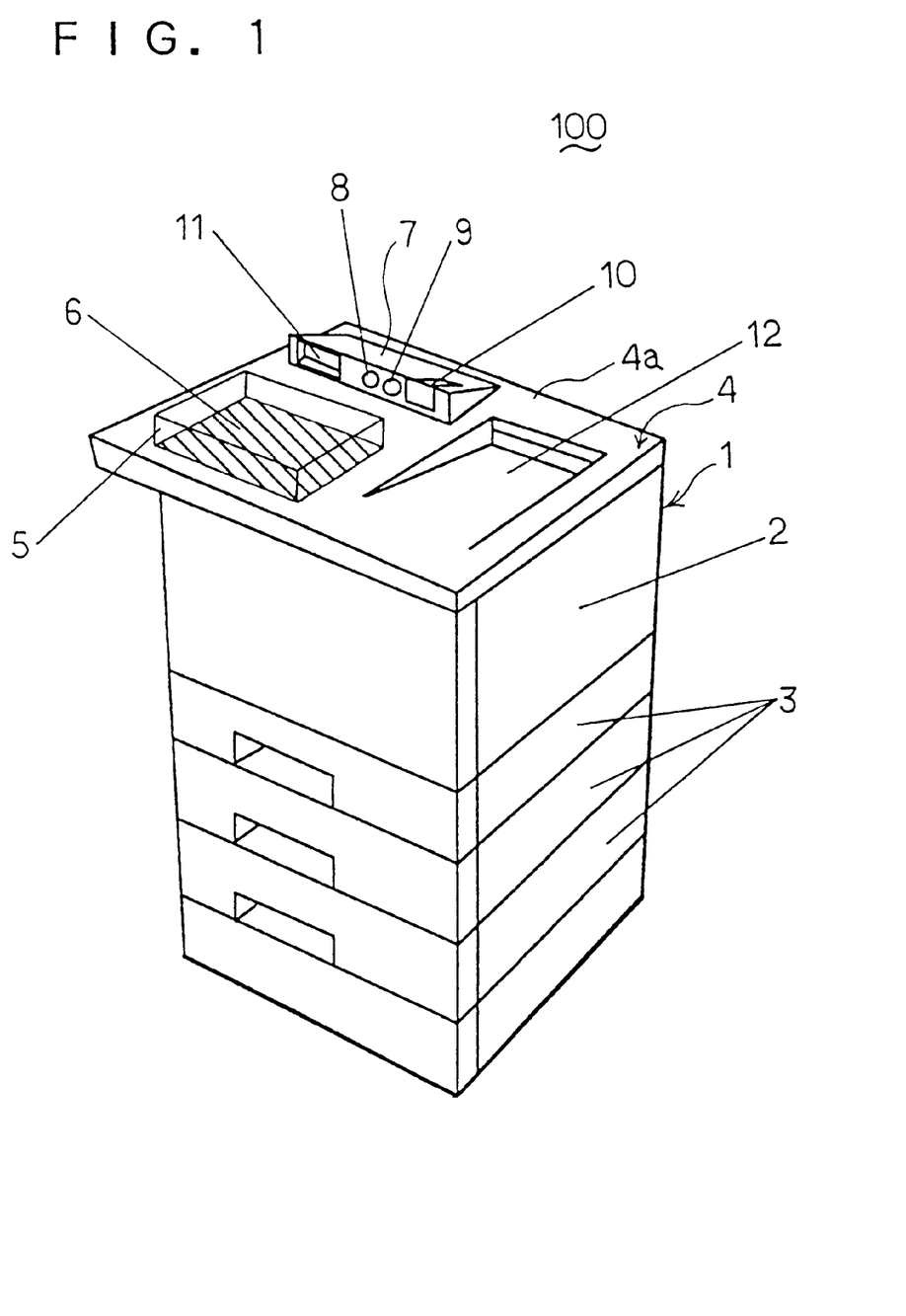
FIG. 1 is a perspective view of the entire structure of a printer according to a first embodiment of the present invention.

Some embodiments of an image producing apparatus according to the present invention will be described referring to the accompanying drawings. FIG. 1 is a perspective view of the entire structure of a printer showing a first embodiment of the present invention. The printer 100 has a body 1 of a box-like shape. The body 1 comprises a printing unit (an image producing unit) 2 such as a laser, a paper feed unit 3, and a top plate 4. A table 6 is provided over the upper surface 4a of the top plate 4 for placing a note computer (an external device) 5. Also, a connector unit (a connecting terminal) 7 having a group of connecting ports for connection to the note computer 5 is provided on the upper surface 4a opposite to the table 6. More specifically, the connector unit 7 includes a serial port 8 and a parallel port 9 for connection by cables to the note computer 5, an infrared port 10 for infrared communication, and a power supply outlet (a receptacle) 11. A paper discharge recess 12 (a paper stack) is provided on the upper surface 4a so that the paper printed by a printing unit 2 in response to an output command of the note computer 5 can be received by the paper discharge recess 12.

The note computer 5 is placed on the table 6 provided over the upper surface 4a of the top plate 4 when being connected to the printer 100 and can thus be handled with much ease. Also, since no extra table for placing the note computer 5 is provided beside the printer 100, a marginal space about the printer 100 is eliminated. Moreover, the ports 8, 9, and 10 and the power supply outlet 11 are located on the connector unit 7 adjacent to the table 6 hence allowing prompt connection to the note computer 5.

Figure 2:
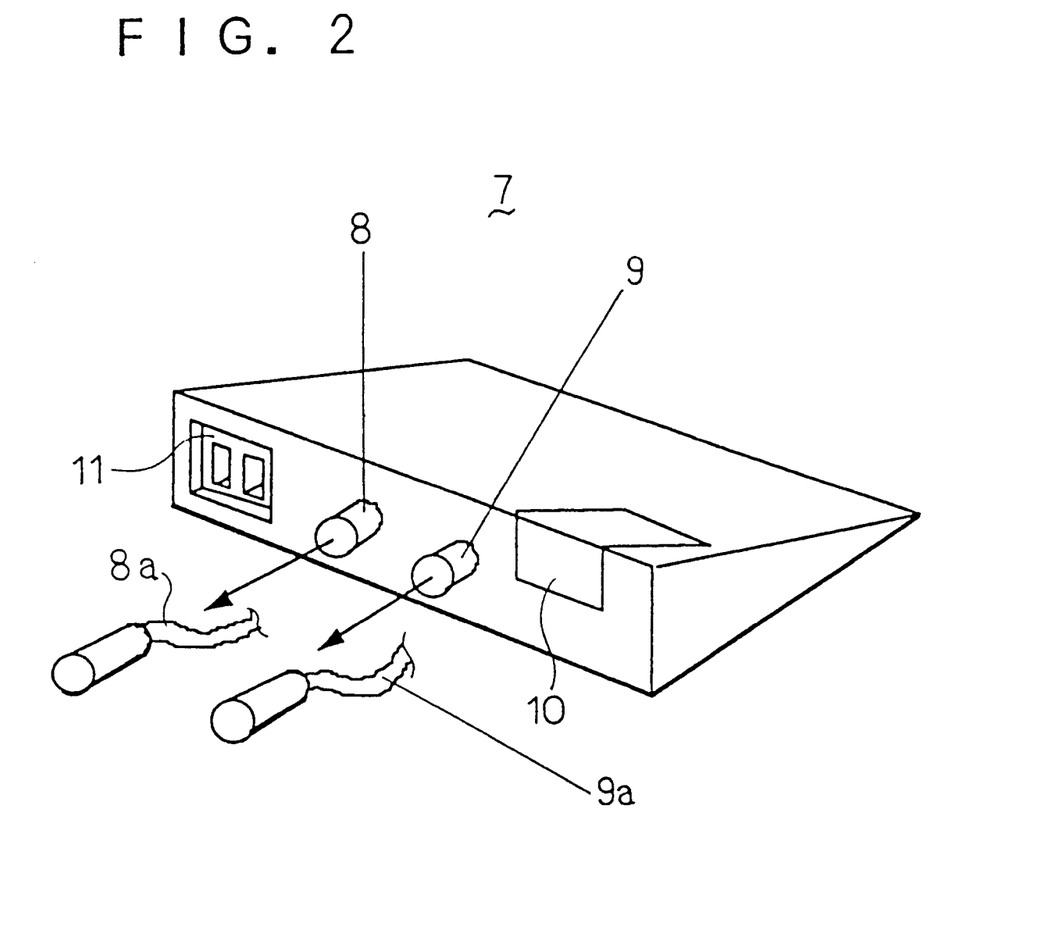
FIG. 2 is a perspective view of a connector unit of a printer according to a second embodiment of the present invention.

FIG. 2 is a perspective view of a connector unit 7 of a printer 100 according to a second embodiment of the present invention. In particular, the connector unit 7 of the second embodiment has a serial port 8 and a parallel port 9 thereof equipped with reel cords (connecting cables) 8a and 9a respectively. The reel cords 8a and 9a are rolled up in the connector unit 7 when the note computer 5 is not connected. In use, the reel cords 8a and 9a are drawn out in the direction denoted by the arrow and joined as connecting cables to the note computer 5 for data communication. The reel cords 8a and 9a remain urged in an opposite direction so that they can automatically be returned back to their reels in the connector unit 7 upon separated from the note computer 5. The second embodiment permits the printer 100 to be connected to the note computer 5 with no use of separate cables and will be easier in connection of the note computer 5 than the first embodiment.

Figure 3:
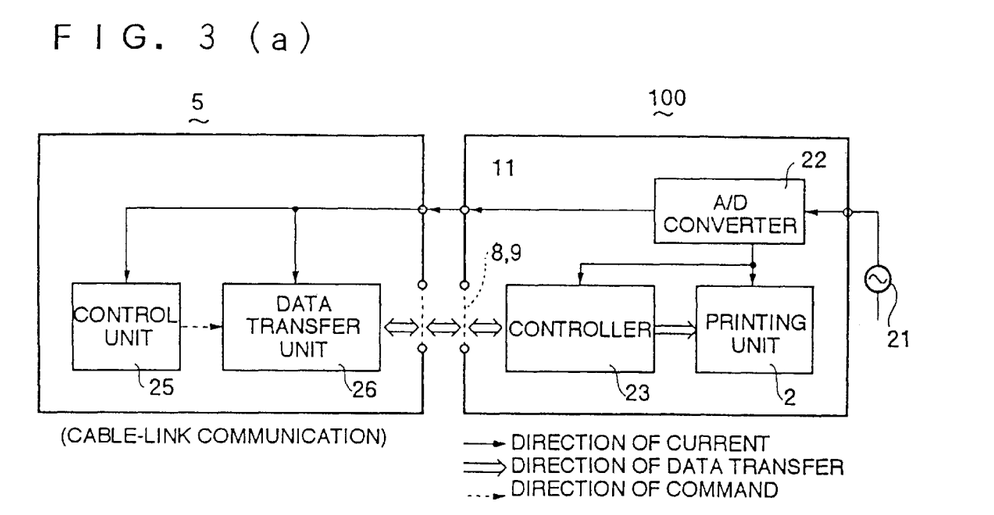
FIG. 3(a) is a block diagram of the printer and a note computer connected to each other by connecting cables for cable-link communication.
FIG. 3(b) is a block diagram of the printer and a note computer connected to each other by a beam of infrared ray for optical data communication.

FIG. 3(a) illustrates the printer 100 and the note computer 5 connected to each other by cables while FIG. 3(b) shows the same connected by beams of infrared ray. The printer 100 shown in FIG. 3(a) hence includes an A/D (analog/digital) converter 22 for converting analog data supplied by an external AC source 21 to digital data, a controller 23 for processing input data in a bit-map format, and a printing unit 2. The DC current produced by A/D converter 22 is transferred to various components in the printer 100 and via the power supply outlet 11 to the note computer 5. The note computer 5 includes a controller unit 25 for controlling overall operations and a data transfer unit 26 for transmitting data to the printer 100 in cable-link communication. In case of the cable-link communication shown in FIG. 3(a), the data transfer unit 26 responding to a command from the controller unit 25 in the note computer 5 transmits printing data to the printer 100. The controller 23 in the printer 100 receives the printing data from the data transfer unit 26 of the note computer 5 via its serial port 8 or parallel port 9 and after giving a series of relevant processes, transfers the data to the printing unit 2.

The printer 100 shown in FIG. 3(b) includes, in addition to the above components, a light receiver/data converter unit 24 equipped with an infrared port 10. The note computer 5 is also added with a data generator unit 27 for generating data to be transferred to the printer 100 in optical data communication, and an optical transfer unit 28 for converting the data generated by the data generator unit 27 to an optical data and transmitting it to the printer 100. In the case of optical data communication shown in FIG. 3(b), the printing data is generated by the data generator 27 responding to a command from the control unit 25 and converted by the optical transfer unit 28 to the optical data in the note computer 5 before transferred to the printer 100. The light receiver/data converter unit 24 of the printer 100 receives the optical data from the optical transfer unit 28 at its infrared port 10, converts it to a data format operable in the controller 23, and transmits the data format to the printing unit 2.

Figure 4:
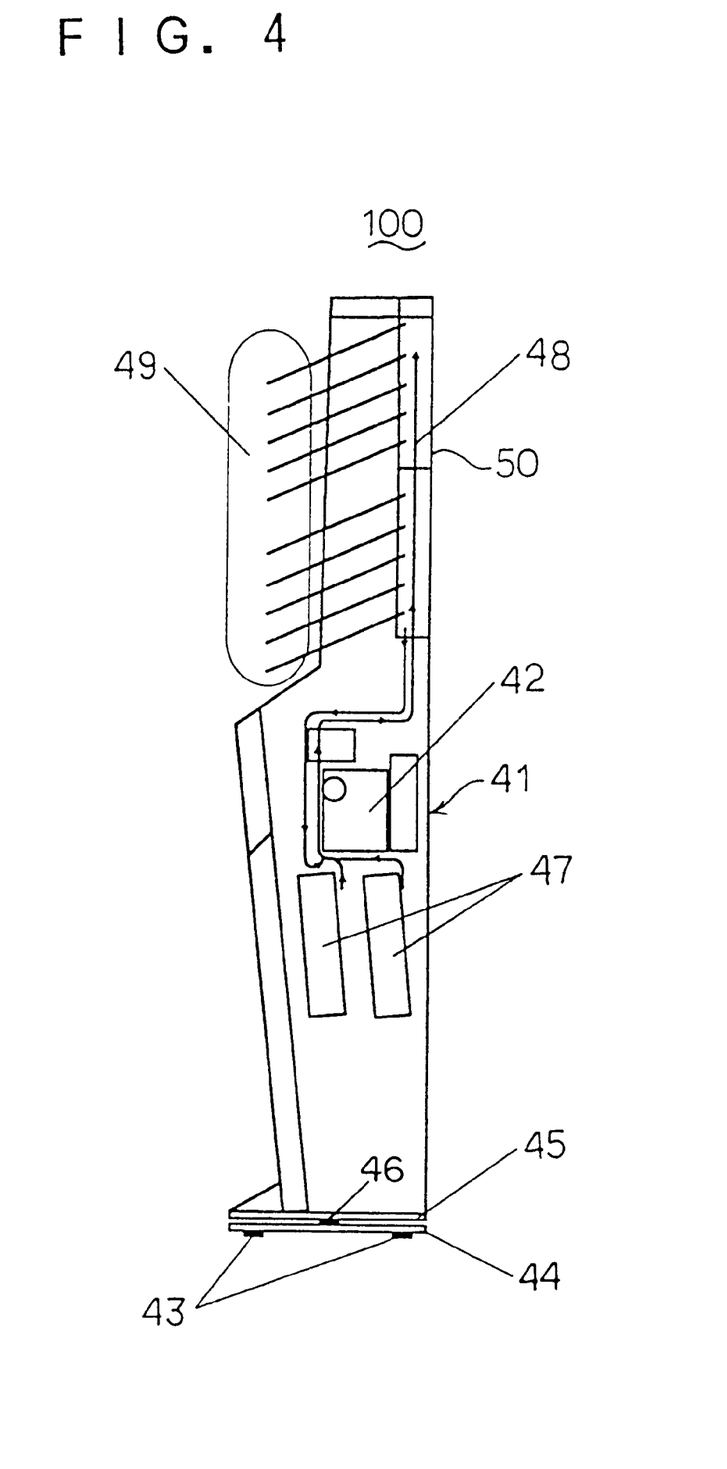
FIG. 4 is a longitudinal cross sectional view of a printer provided with a stationary rotating mechanism according to a third embodiment of the present invention.

FIG. 4 illustrates a printer 100 provided with a stationary rotating mechanism showing a third embodiment of the present invention. The printer 100 comprises a body 41 including a printing unit (an image producing unit) 42, a platform (a base member) 44 having locating members 43 provided on a bottom thereof, and a joint mechanism (a joint means) 46 for joining between the platform 44 and a base 45 of the body 41. The joint mechanism 46 supports the body 41 so that the body 41 can swivel horizontally on the platform 44. In operation, a paper from a paper feed unit 47 is printed in the printing unit 42, conveyed along a paper passage route 48, and discharged to a discharge tray 49. An openable cover 50 is provided on the back of the body 41 for ease of removing a sheet of paper jammed up in the paper passage route 48. The printer 100 of this embodiment is so designed as to allow any sheet of paper jammed up in the paper passage route (a conveying passage) located on the side opposite to the operation panel side or front side to be easily removed.

Figure 5:
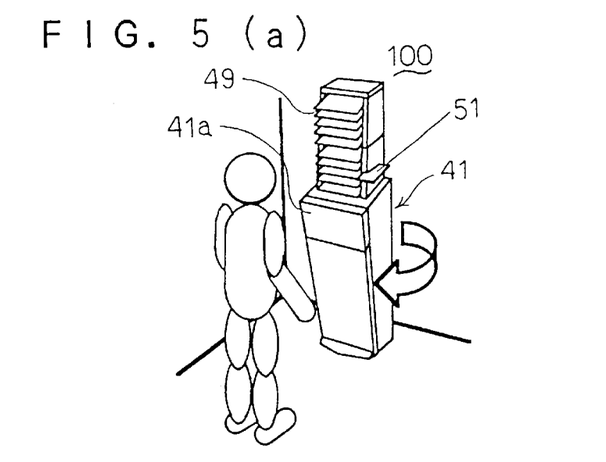
FIGS. 5(a)—(c) are diagrams showing steps of eliminating paper jamming in a paper passage route at the side opposite to a front side where an operation panel is located in the printer of the third embodiment.

FIGS. 5(a), 5(b), and 5(c) show steps of eliminating paper jamming in the paper passage route 48 on the back side 41c of the body 41 which is opposite to the front side 41a where an operation panel 51 is mounted. If a sheet of paper is jammed up in the paper passage route 48 on the back side 41c (refer to FIG. 4), the body 41 is horizontally turned on the platform 44 by the user about a pivot of the joint mechanism 46. This is followed by opening the cover 50 at the back side 41c and removing the jammed sheet of paper from the paper passage route 48.

Figure 6:
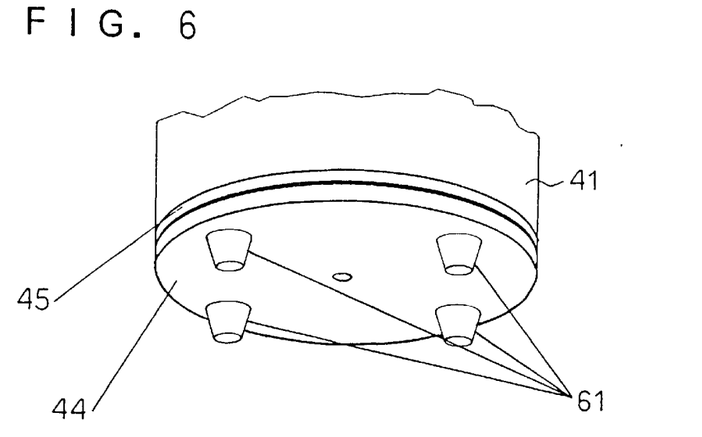
FIG. 6 is a perspective view showing a base in the printer of the third embodiment, which has rubber feet employed as locating members.
Figure 7:
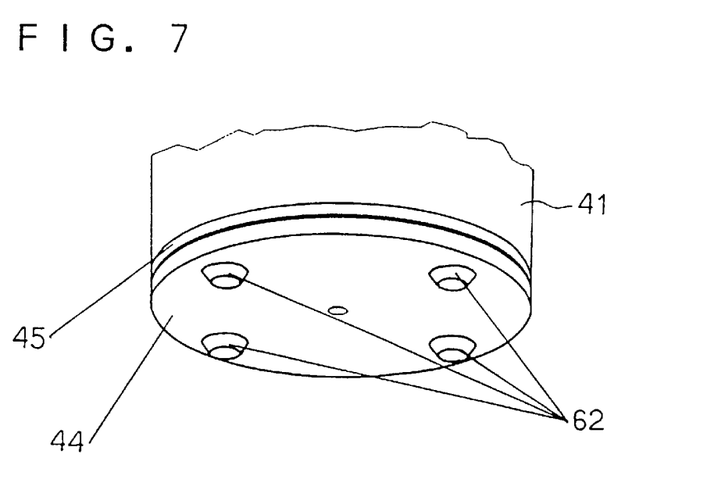
FIG. 7 is a perspective view showing a base which has feet formed integral therewith as locating members.
Figure 8:
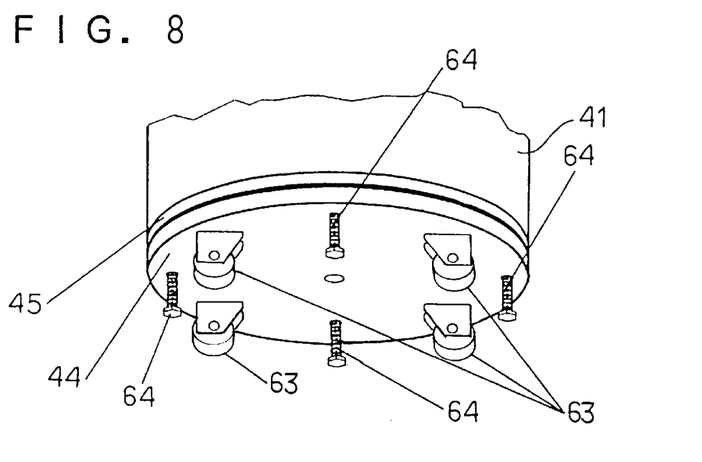
FIG. 8 is a perspective view showing a base which has a combination of movable casters and setting adjusters employed as locating members.

Some modifications of the locating members 43 mounted to the bottom of the platform 44 are illustrated in FIGS. 6 to 8. FIG. 6 shows the platform 44 with rubber feet 61 employed as the locating members 43. FIG. 7 shows the platform 44 with four feet 62 formed integral with the platform 44 used as the locating members 43. Such shapes of the locating members 43 on the platform 44 permit the platform 44 to be seated steadily on the floor. FIG. 8 shows the platform 44 with a combination of movable casters 63 and setting adjuster 64 employed as the locating members 43. Each of the setting adjusters 64 (setting members) has a thread provided on the side thereof and its extension downwardly from the platform 44 can be adjusted by screwing in and out the platform 44. When the casters 63 are not in use, the setting adjusters 64 are lengthened so that their extension is greater than the height of the casters 63 beneath the platform 44. Accordingly, the platform 44 is seated on the setting adjusters 64 at a stationary location of the floor while the movable casters 63 being spaced from the floor. Also, the distance between the platform 44 and the floor can be controlled by adjusting the downward extension of the setting adjusters 84 from the platform 44. When the downward extension of the setting adjusters 64 from the platform 44 is decreased to set the casters 63 directly on the floor, the printer 100 can be moved with the casters 63 to a desired location.

Figure 9:
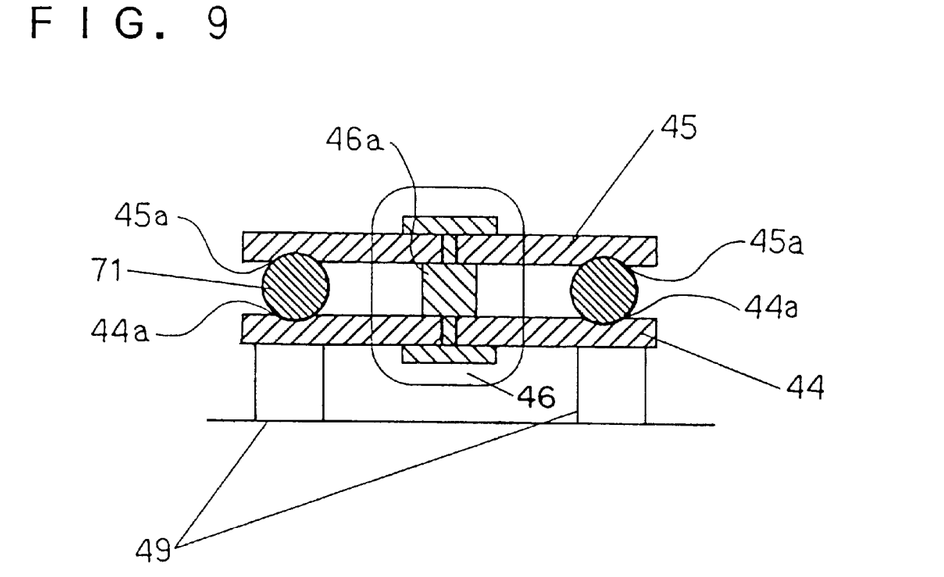
FIG. 9 is a longitudinal cross sectional view of the stationary rotating mechanism provided with ball bearings.
Figure 10:
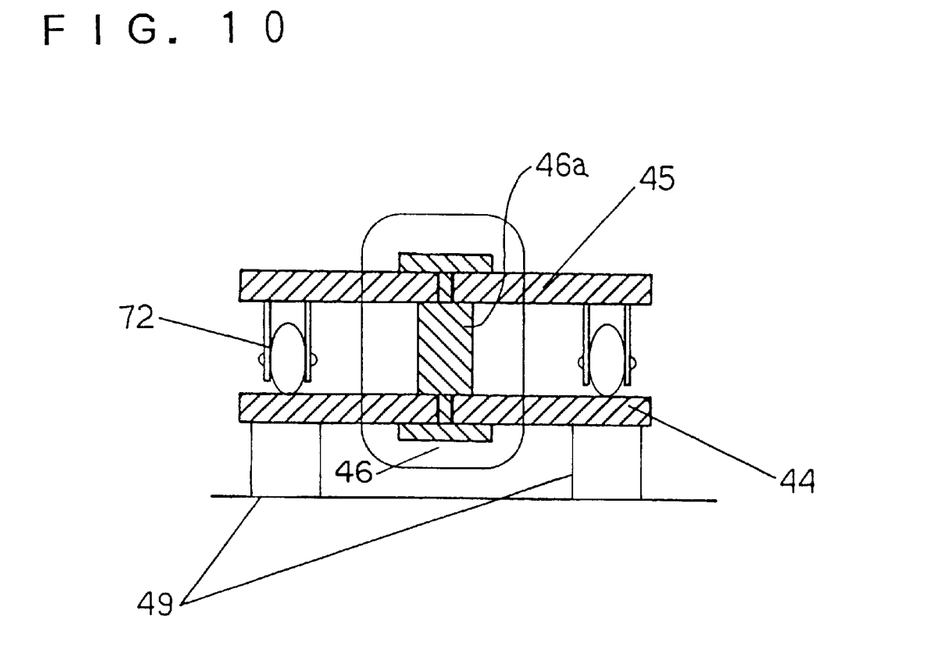
FIG. 10 is a longitudinal cross sectional view of the stationary rotating mechanism provided with rollers.

Arrangements of the stationary rotating mechanism for horizontally swiveling the body 41 in relation to the platform 44 are now explained. FIG. 9 illustrates an arrangement of the stationary rotating mechanism using a ball bearing. FIG. 10 shows another arrangement of the stationary rotating mechanism using rollers. The stationary rotating mechanism shown in FIG. 9 comprises an annular groove 45a provided in the lower surface of the base 45, a ball bearing 71, a recess 44a provided in the upper surface of the platform 44 for positioning the ball bearing 71, and a joint mechanism 46. When the base 45 is horizontally turned on the platform 44 about a pivot 46a of the joint mechanism 46, the ball bearing 71 rotates along the groove 45a in the base 45. This action allows the base 45 to swivel smoothly at the stationary location. The stationary rotating mechanism shown in FIG. 10 comprises rollers 72 mounted to the lower surface of the base 45 and a joint mechanism 46. Equally, when the base 45 is horizontally rotated on the platform 44 about a pivot 46a of the joint mechanism 46, the rollers 72 run on the platform 44 in the rotating direction of the base 45. This action allows the base 45 and thus the body 41 to swivel smoothly at the stationary location.

Figure 11:
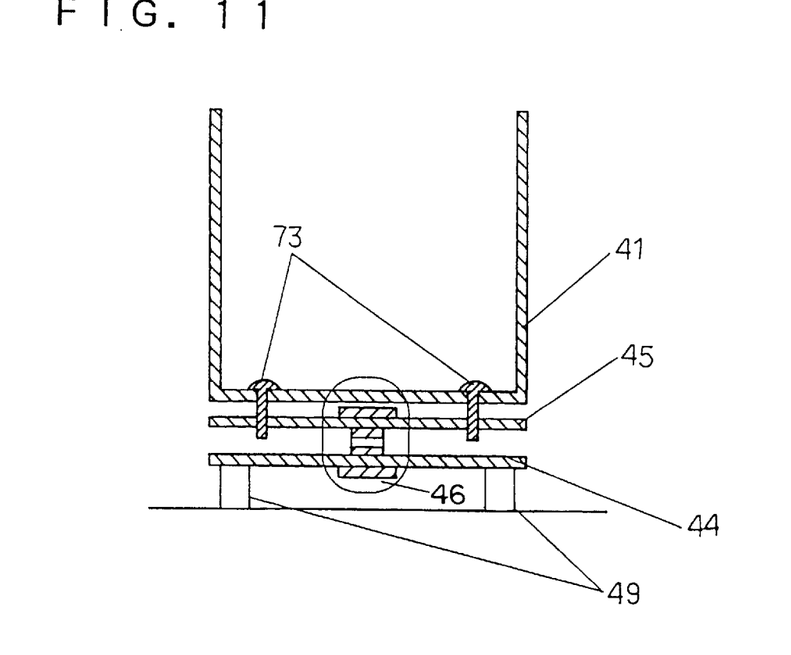
FIG. 11 is a cross sectional view showing the stationary rotating mechanism separated from the body.
Figure 12:
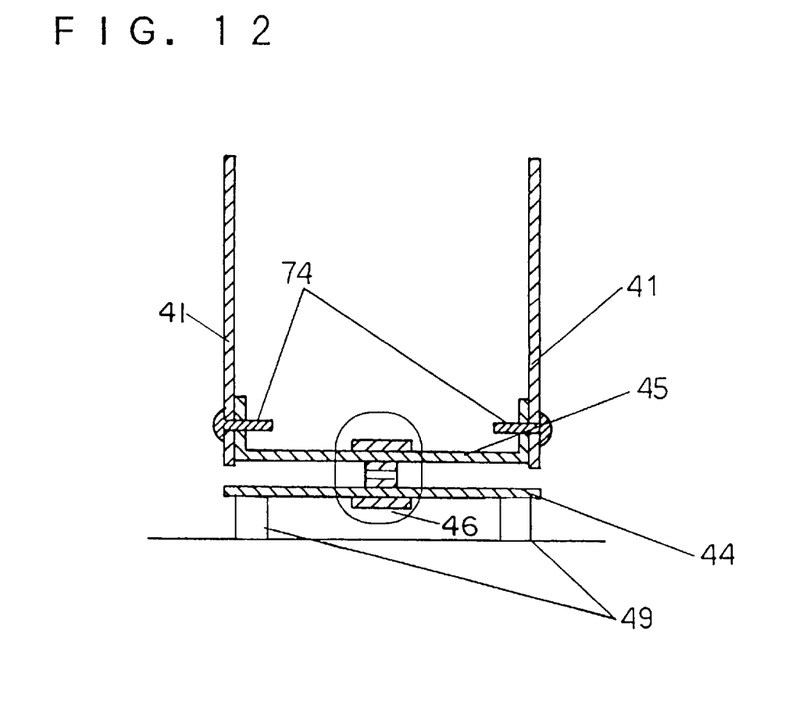
FIG. 12 is a cross sectional view showing the stationary rotating mechanism joined directly with the body.

Arrangements of the base 45 of the body 41 are shown in FIGS. 11 and 12. FIG. 11 illustrates the base 45 joined at one side to a joint mechanism 46 which acts as a pivot for swiveling motion at a stationary location and at the other side to the body 41 by retaining screws 73. Accordingly, the joint of the base 45 allows the body 41 to be spaced from the stationary rotating mechanism. FIG. 12 shows the base 45 joined directly with retaining screws 74 to the body 41 so that it serves as a bottom plate of the body 41. As the base 45 is joined to a joint mechanism 46 which acts as a pivot of the stationary rotating mechanism, the body 41 can directly swivel with the stationary rotating mechanism.

Figure 13:
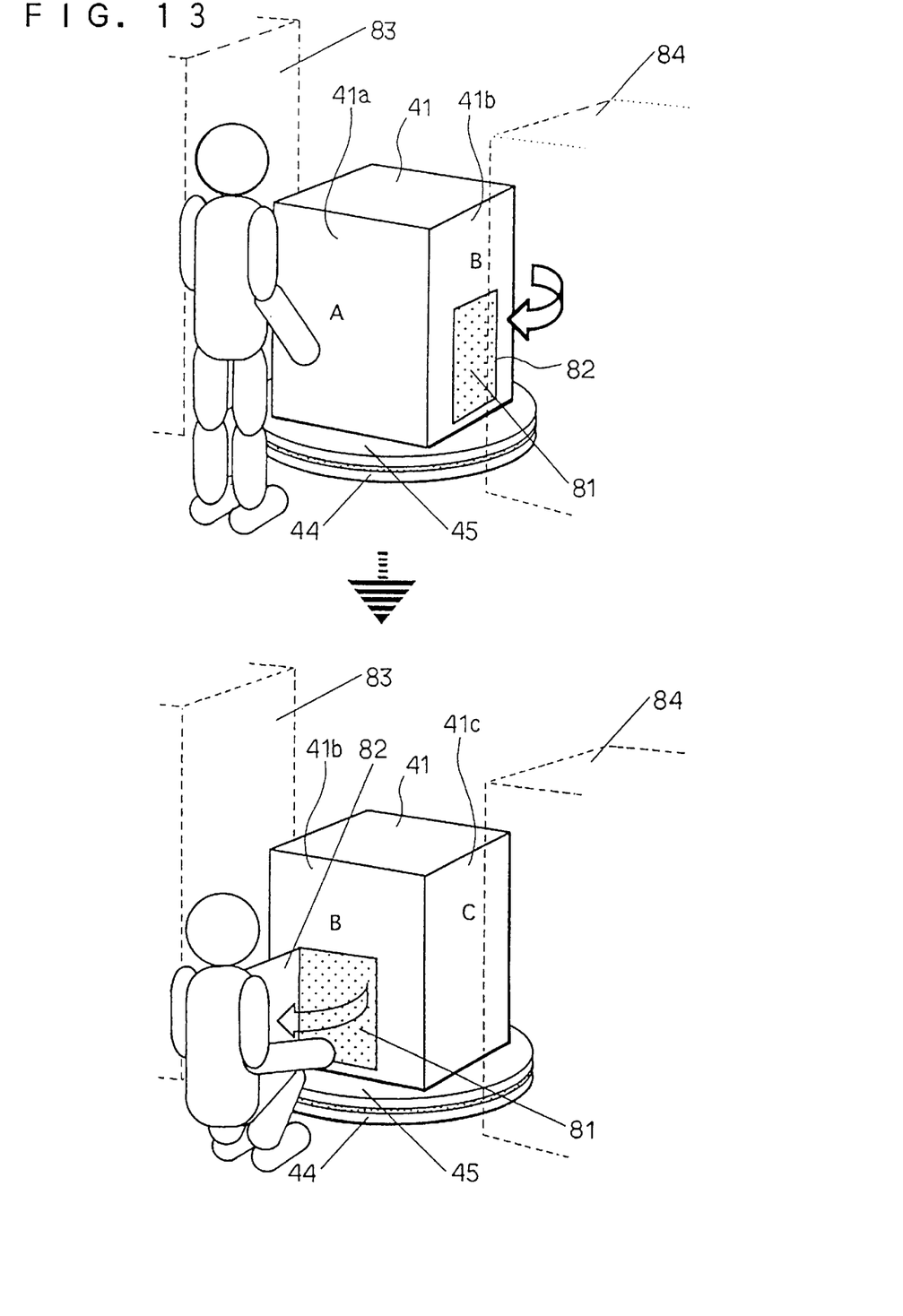
FIG. 13 is a view showing steps of eliminating paper jamming in the paper passage route at a side of the printer next to the front side where the operation panel is mounted.

Steps of removing a jammed sheet of paper from the paper passage route 48 at one side of the body 41 next to the front side 41a (See FIG. 4) where the operation panel 51 (FIG. 5(a)) is mounted are explained referring to FIGS. 13(a) and 13(b). If the jammed sheet of paper is found at the side 14b in the paper passage route 48, the body 41 is horizontally turned by the user about the pivot 46a of the joint mechanism 46 (FIG. 9) on the platform 44 at the stationary location and followed by opening a side cover 82 near the location of jamming 81 at the side 41b and removing the jammed sheet of paper away from the paper passage route 48. Since the body 41 is allowed by the stationary rotating mechanism to swivel horizontally on the platform 44 about the joint mechanism 46, the user can easily access to the side 41b of the body 41 where a sheet of paper is jammed up at the location 81 without dislocating, if sited, obstacles 83 and 84 about the area of installation.

Although the connector unit 7 is provided with the infrared port 10 for optical data communication with infrared ray in the first and second embodiments, it may include a laser port for data communication with laser beams. The opening of the cover 50 at the back 41c or 82 at the side 14b is not limited to instant access to the paper passage route 48 (a conveying passage) in the third embodiment but may allow access to the printing unit (an image producing unit) 42. This makes the maintenance of the printing unit 42 simple and easy.

It is understood that the present invention is not limited to the foregoing embodiments but various changes will be possible without departing from the scope of the present invention.

What is claimed is:

1. An image producing apparatus, to which an external device is capable of being connected, comprising:
   a body which includes an image producing unit inside there;
   a table which is disposed at a top surface of the body, and on which an external device is capable of being mounted; and
   a connection port located adjacent to the table, wherein the connection port includes a connecting cable contained within said connection port, said connecting cable capable of being drawn out so as to be connected to said external device and drawn back in to said connection port.

2. An image producing apparatus as claimed in claim 1, further comprising a paper stack which contains paper discharged from the image producing unit, wherein the paper stack is disposed at a top surface of the body.

3. An image producing apparatus as claimed in claim 1, wherein the connection port has a communication terminal to the external device.

4. An image producing apparatus as claimed in claim 3, wherein the communication terminal connects a cable.

5. An image producing apparatus as claimed in claim 4, wherein the communications terminal has a connecting cable, and said connecting cable is retractable contained inside the port and capable of being drawn outside of the port.

6. An image producing apparatus as claimed in claim 3, wherein the communication terminal performs infrared communication.

7. An image producing apparatus as claimed in claim 1, the connection port comprises an outlet for supplying a power to the external device.

8. A method for connecting an image producing apparatus and an external device, comprising:
   mounting an external device on a table disposed at a top surface of the image producing apparatus; and
   connecting the image producing apparatus and the external device through a connection port which is located adjacent to the table, wherein the connection port includes a connecting cable that is drawn outside the connection port to connect the external device and the image producing apparatus, and that is retractable drawn inside the connection port when not connected.

9. An image producing apparatus, to which an external device is capable of being connected, comprising:
   a body which includes an image producing unit inside said body;
   a table which is disposed at a top surface of the body, and on which an external device is capable of being mounted;
   a first communication terminal for functionally connecting said image producing apparatus and the external device, said first communication terminal being located adjacent to the table; and,
   a second communication terminal for functionally connecting said image producing apparatus and the external device, said second communication terminal being located adjacent to the table, wherein said first communication terminal is a different type from said second communication terminal.

10. An image producing apparatus as claimed in claim 9, wherein at least one of said first and second communication terminals performs wired communication.

11. An image producing apparatus as claimed in claim 9, wherein one of said first and second communication terminals performs wireless communication.

* * * * *